United States Patent
Fukutomi et al.

(10) Patent No.: US 10,417,124 B2
(45) Date of Patent: Sep. 17, 2019

(54) STORAGE SYSTEM THAT TRACKS MAPPING TO A MEMORY MODULE TO BE DETACHED THEREFROM

(71) Applicant: TOSHIBA MEMORY CORPORATION, Tokyo (JP)

(72) Inventors: Kazuhiro Fukutomi, Yokohama Kanagawa (JP); Shingo Tanaka, Yokohama Kanagawa (JP)

(73) Assignee: Toshiba Memory Corporation, Tokyo (JP)

(*) Notice: Subject to any disclaimer, the term of this patent is extended or adjusted under 35 U.S.C. 154(b) by 0 days.

(21) Appl. No.: 16/112,314

(22) Filed: Aug. 24, 2018

(65) Prior Publication Data

US 2018/0364924 A1 Dec. 20, 2018

Related U.S. Application Data

(63) Continuation of application No. 15/063,203, filed on Mar. 7, 2016, now Pat. No. 10,095,423.

(60) Provisional application No. 62/234,758, filed on Sep. 30, 2015.

(51) Int. Cl.

| G06F 3/06 | (2006.01) |
|---|---|
| G06F 12/02 | (2006.01) |
| G06F 12/1009 | (2016.01) |
| G06F 11/07 | (2006.01) |

(52) U.S. Cl.
CPC ........ *G06F 12/0253* (2013.01); *G06F 3/0617* (2013.01); *G06F 3/0619* (2013.01); *G06F 3/0635* (2013.01); *G06F 3/0647* (2013.01); *G06F 3/0688* (2013.01); *G06F 11/07* (2013.01); *G06F 12/0246* (2013.01); *G06F 12/1009* (2013.01); *G06F 2212/1044* (2013.01); *G06F 2212/7201* (2013.01); *G06F 2212/7205* (2013.01)

(58) Field of Classification Search
CPC ...... G06F 3/0616; G06F 3/064; G06F 3/0688; G06F 12/0246; G06F 12/0253; G06F 12/1009; G06F 2212/7201; G06F 2212/7205
See application file for complete search history.

(56) References Cited

U.S. PATENT DOCUMENTS

| 8,117,376 | B2 | 2/2012 | Hemmi |
|---|---|---|---|
| 9,013,920 | B2 | 4/2015 | Stoev et al. |
| 9,268,687 | B2 | 2/2016 | Liang |
| 2009/0063895 | A1 | 3/2009 | Smith |

(Continued)

*Primary Examiner* — Reginald G Bragdon
*Assistant Examiner* — Edward Wang
(74) *Attorney, Agent, or Firm* — Kim & Stewart LLP

(57) ABSTRACT

A storage system connectable to a host includes a plurality of interface units, a plurality of semiconductor memory modules, each being detachably coupled with one of the interface units, and a controller configured to maintain an address conversion table indicating mappings between logical addresses and physical addresses of memory locations in the semiconductor memory modules. When the controller determines that a first semiconductor memory module needs to be detached, the controller converts physical addresses of the first semiconductor memory module into corresponding logical addresses using the address conversion table and copies valid data stored in the corresponding logical addresses to another semiconductor memory module and update the address conversion table to indicate new mappings for the corresponding logical addresses of the valid data.

17 Claims, 15 Drawing Sheets

(56) References Cited

U.S. PATENT DOCUMENTS

| | | |
|---|---|---|
| 2011/0202812 A1 | 8/2011 | Asano et al. |
| 2011/0214033 A1 | 9/2011 | Yoshii et al. |
| 2012/0246383 A1 | 9/2012 | Asano et al. |
| 2013/0232391 A1 | 9/2013 | Asano et al. |
| 2014/0310575 A1 | 10/2014 | Asano et al. |
| 2014/0310576 A1 | 10/2014 | Asano et al. |

| LBA (LOGICAL ADDRESS) | PHYSICAL ADDRESS | VALID/INVALID |
|---|---|---|
| 0x0000 0000 | | 1 |
| 0x0000 0001 | | 0 |
| ⋮ | ⋮ | ⋮ |
| n | | 1 |

| KEY | PHYSICAL ADDRESS | VALID/INVALID |
|---|---|---|
| David1 | | 1 |
| John2 | | 0 |
| ⋮ | ⋮ | ⋮ |
| | | 1 |

…

STORAGE SYSTEM THAT TRACKS MAPPING TO A MEMORY MODULE TO BE DETACHED THEREFROM

CROSS-REFERENCE TO RELATED APPLICATIONS

This application is a continuation of U.S. patent application Ser. No. 15/063,203, filed on Mar. 7, 2016, which is based upon and claims the benefit of priority from U.S. Provisional Patent Application No. 62/234,758, filed on Sep. 30, 2015, the entire contents of each of which are incorporated herein by reference.

FIELD

The following embodiments relate to a storage system, in particular, a storage system including a plurality of memory modules that are detachably coupled with interface units thereof.

BACKGROUND

A storage system of one type includes a plurality of memory modules, each of which includes a storage medium such as non-volatile semiconductor memory. In such a storage system, the non-volatile semiconductor memories are nanoscaled to increase storage capacity. However, because the nanoscaling of the non-volatile semiconductor memories may shorten the overwriting life thereof, the reliability of non-volatile semiconductor memories may decrease.

DETAILED DESCRIPTION

According to an embodiment, a storage system connectable to a host includes a plurality of interface units, a plurality of semiconductor memory modules, each being detachably coupled with one of the interface units, and a controller configured to maintain an address conversion table indicating mappings between logical addresses and physical addresses of memory locations in the semiconductor memory modules. When the controller determines that a first semiconductor memory module needs to be detached, the controller converts physical addresses of the first semiconductor memory module into corresponding logical addresses using the address conversion table and copies valid data stored in the corresponding logical addresses to another semiconductor memory module and update the address conversion table to indicate new mappings for the corresponding logical addresses of the valid data.

One or more embodiments of a storage system and a data management method will be described below.

(Configuration of Storage System)

Figure 1:
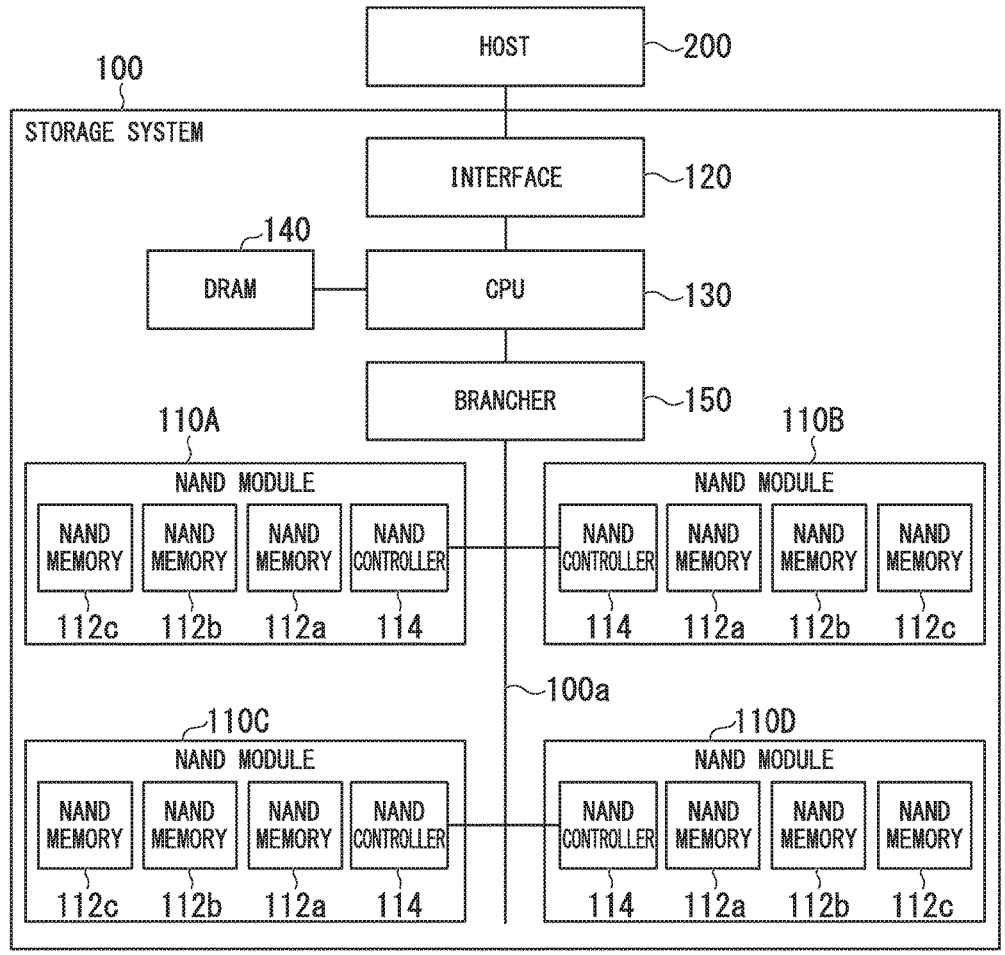
FIG. 1 shows the configuration of a memory system according to an embodiment.

FIG. 1 is a block diagram of a storage system 100 according to an embodiment. The storage system 100 of the present embodiment is, for example, a NAND flash array. The storage system 100 communicates with a host 200. The storage system 100 and the host 200 perform data communication in accordance with an interface standard, such as ATA (Advanced Technology Attachment) or SATA (Serial ATA), SCSI (Small Computer System Interface), SAS (Serial Attached SCSI), NVM Express (Non-Volatile Memory Express), ZIF (Zero Insertion Force), LIF (Low Insertion Force), USB (Universal Serial Bus), PCI Express, TCP/IP or the like.

The host 200 designates a logical address in the storage system 100 and transmits a request to store write data (write request) in the storage system 100. Also, the host 200 designates a logical address in the storage system 100 and transmits a request to read out read data (read request) from the storage system 100. The write request or the read request includes the logical address of data that is the subject for writing and reading.

Write data stored in the storage system 100 are data that are sent from the host 200, which corresponds to a user of the storage system 100. In the following, write data stored in the storage system 100 in accordance with the write request from the host 200 (or already stored therein) will be called user data.

The storage system 100 includes a plurality of NAND modules 110A, 110B, 110C, and 110D, an interface unit 120, a CPU 130, a DRAM (dynamic random-access memory) 140, and a brancher 150. In the description below, unless a NAND module is distinguished from another NAND module, "NAND module 110" will be used. Although the storage system 100 of the present embodiment includes four NAND modules 110, the storage system 100 of the present embodiment may include N NAND modules 110 (where N is an arbitrary natural number of 2 or greater).

The NAND module 110 includes the NAND memories 112a, 112b, and 112c and a NAND controller 114. In the description below, unless a NAND memory is distinguished from another NAND memory, "NAND memory 112" will be used. Although the NAND module 110 of the present embodiment includes three NAND memories 112, the NAND module 110 may include M NAND memories 112 (where M is an arbitrary natural number of 1 or greater).

The NAND memory 112 is a NAND-type flash memory that includes a plurality of physical blocks, each including a plurality of memory cells. The NAND memory 112 writes write data in accordance with a write request output from the NAND controller 114. Specifically, the NAND memory 112 writes write data associated with a write request into a location of a physical address corresponding to a logical address included in the write request. The NAND memory 112 reads out data in accordance with a read request output from the NAND controller 114. Specifically, the NAND memory 112 reads data from a location of a physical address corresponding to a logical address included in the read request and outputs the read data to the NAND controller 114.

The plurality of NAND memories 112 may be a combination of different types of NAND memories. The type of a NAND memory 112, depending on the storage capacity of each cell in the NAND memory 112, is categorized, for example, as an SLC (single-level cell) NAND memory or an MCL (multi-level cell) NAND memory. An SLC NAND memory stores one bit of data in a cell, and an MLC NAND memory stores multiple bits of data in a cell. MLC NAND memories of one type include TLC (triple-level cell) NAND memories that store 3 bits of data in a cell. NAND memory differs with regard to the number of times writing operations can be carried out and the number of times readout operations can be carried out, depending on an integration level of stored data. A single-level cell NAND memory, although having a low integration level, includes a high durability and allows higher numbers of write operations and readout operations than a multi-level cell NAND memory.

The storage system 100 of the present embodiment may include another type of memory in place of the NAND memory 112. For example, the storage system 100 may include a hard disk, a bit cost scalable (BiCS) memory, a magnetoresistive memory (MRAM), a phase change memory (PCM), a resistance random-access memory (RRAM®), or a combination thereof.

The NAND controller 114 is connected to a data bus 100a, and receives a read request or a write request of user data with respect to the NAND memory 112. The NAND controller 114 stores, as a correspondence table (not shown), physical addresses of the corresponding NAND memory 112 connected thereto. If the physical address designated by a write request or a read request is included in the correspondence table thereof, the NAND controller 114 outputs a write request or a read request to the corresponding NAND memory 112. If the physical address designated by a write request or a read request is not included in the correspondence table thereof, the NAND controller 114 discards (ignores) the write request or the read request.

When outputting a write request or a read request to the NAND memory 112, the NAND controller 114 converts the write request or the read request in accordance with a command format that is recognized by the corresponding NAND memory 112, and output the converted write request or read request to the NAND memory 112. Also, the NAND controller 114 converts data read out by the NAND memory 112 in accordance with a command format in the CPU 130, and outputs the converted data to the CPU 130, via the data bus 100a and the brancher 150. The brancher 150 is, for example, a switch called a fabric.

Figure 2:
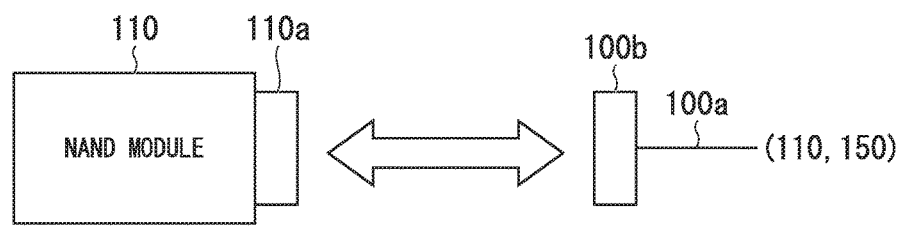
FIG. 2 schematically illustrates a module interface in a NAND module included in the memory system according to the embodiment.

FIG. 2 schematically illustrates a NAND module and a data bus interface according to the present embodiment.

The NAND module 110 includes a module interface 110a by which the NAND module 110 is physically and electrically attached to and detached from the data bus 100a. While the module interface 110a is attached to the interface 100b of the data bus 100a, the module interface 110a transmits a write request or a read request over the data bus 100a via the interface 100b. The interface 100b is implemented, for example, by a connector that can be mechanically and electrically attached to and detached from the module interface 110a.

The NAND module 110 includes a capacitor (not shown). For that reason, immediately after the module interface 110a is detached from the interface 100b, the NAND module 110 can still write into the NAND memory 112 data stored in volatile memory (not shown) such as RAM.

The interface unit 120 communicates with the host 200 in accordance with a prescribed interface standard. The interface unit 120, for example, communicates with the host 200 in accordance with TCP/IP. If the interface unit 120 receives a write request or a read request transmitted from the host 200, the interface unit 120 outputs the write request or the read request to the CPU 130. If the interface unit 120 has received a read response output from the CPU 130 as the result of a read request, the interface unit 120 transmits the read response to the host 200.

Figures 3, 4, 5:
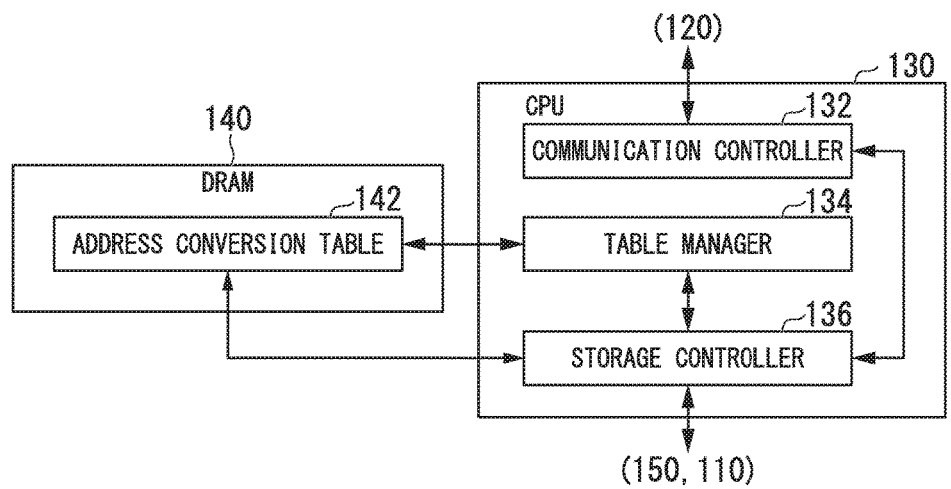
FIG. 3 shows the functional configuration of a CPU in the memory system according to the embodiment.
FIG. 4 shows an example of an address conversion table for logical block addresses (LBAs) that can be used in the memory system according to the embodiment.
FIG. 5 shows an example of a key-value-type address conversion table that can be used in the memory system according to the embodiment.

The CPU 130 (controller), based on a write request or a read request, controls writing and reading of user data with respect to the NAND module 110. FIG. 3 shows a functional configuration of the CPU 130 in the storage system 100 according to the present embodiment. The CPU 130 includes a communication controller 132, a table manager 134, and a storage controller 136.

When a write request or a read request is received from the interface unit 120, the communication controller 132 outputs the write request or read request to the storage controller 136. When a read response is output by the storage controller 136, the communication controller 132 causes transmission of the read response from the interface unit 120 to the host 200.

The table manager 134 manages the address conversion table 142 stored in the DRAM 140. The address conversion table 142 indicates the relationship (mapping) between logical addresses and physical addresses. The logical addresses uniquely identify locations of data stored in the NAND module 110. The physical addresses are assigned to each unit storage region of the plurality of NAND modules 110 attached to the plurality of interfaces. Physical addresses are, for example, assigned as a continuous series of information that identifies storage locations in all of the plurality of NAND modules 110 attached to the plurality of interfaces. The table manager 134 updates the address conversion table 142 in accordance with a control operation by the storage controller 136.

The storage controller 136, in accordance with a write request or a read request output from the interface unit 120, causes writing or reading of user data with respect to the NAND module 110. When outputting a write request to the NAND memory 112, the storage controller 136 refers to the address conversion table 142 and converts the logical address included in the write request to a physical address in the NAND memory 112. The storage controller 136 outputs a write request including the physical address to the NAND controller 114. When outputting a read request to the NAND memory 112, the storage controller 136 refers to the address conversion table 142 and converts the logical address included in the read request to a physical address in the NAND memory 112. The storage controller 136 outputs a read request including the physical address to the NAND controller 114. The storage controller 136 outputs the read data that have been read out by the NAND controller 114 to the interface unit 120, via the data bus 100a.

(Address Conversion Table)

FIG. 4 shows an example of an LBA (logical block address) conversion table that can be used in the storage system 100 according to the present embodiment.

An LBA conversion table 142a indicates correspondence between the logical address (e.g., the LBA) and physical addresses. The physical addresses are set to values that uniquely identify physical storage locations in the storage system 100. The logical addresses are set to unique values that map to the physical addresses.

FIG. 5 shows an example of a key-value address conversion table that can be used in the storage system 100 according to the present embodiment.

A key-value address conversion table 142b indicates correspondence between arbitrary key information of stored user data (i.e., identification information or logical address) and physical addresses of the NAND memory 112 in which the corresponding value (i.e., user data corresponding to the key information) is stored.

The LBA conversion table 142a and the key-value address conversion table 142b may include values that indicate whether or not the user data are valid or invalid in association with the set of the logical address and the physical address. Valid user data are user data that are stored in a physical address and can be read out using a logical address mapped thereto (associated therewith). Invalid user data are user data that are stored in a physical address but are no longer considered to be valid.

(Relationship Between Physical Addresses and Logical Addresses)

Figure 6:
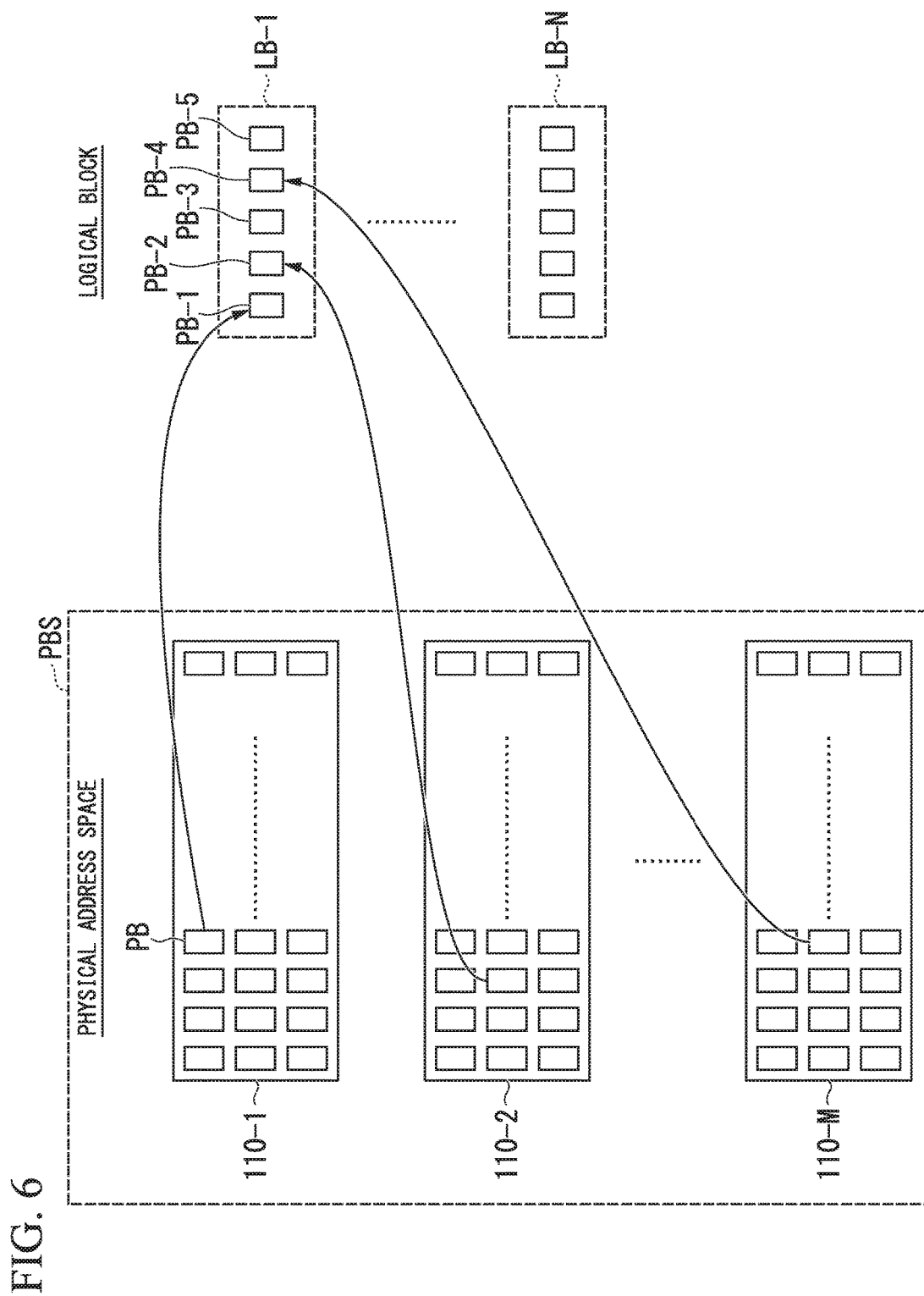
FIG. 6 schematically shows correspondence between a physical address space and logical blocks in the embodiment.

FIG. 6 shows the correspondence between a physical address space and logical blocks in the present embodiment.

As a general rule, in order to use storage regions of all NAND modules 110-1, 110-2, . . . , 110-M (where M is an arbitrary natural number of 1 or greater) connected to the data bus 100a of the storage system 100 as a single storage region, the physical address space (PAS) in the storage system 100 contains identification information of each storage regions of all NAND modules 110. As an exceptional case, some of a NAND module may not be included in the physical address space (PAS). A plurality of physical blocks (PBs) is arranged in each NAND module 110. The plurality of physical blocks is arranged, for example, in a form of matrix, that is, arranged in a first direction and also in a second direction that is orthogonal to the first direction. Each physical block includes a plurality of cells that can store data of a prescribed capacity. The physical block is, for example, a unit for data erasing in a NAND module 110.

The storage system 100 includes a plurality of logical blocks LB-1, . . . , LB-N (where N is an arbitrary natural number of 1 or greater). Each logical block is one virtual storage region that includes a plurality of physical blocks. Each logical block is assigned a prescribed range of logical block numbers (for example, LB-1, . . . , LB-N (where N is an arbitrary natural number of 1 or greater) as described above).

A logical block, for example, corresponds to five physical blocks PB-1, PB-2, PB-3, PB-4, and PB-5. The plurality of physical blocks PB-1, PB-2, PB-3, PB-4, and PB-5 is selected from physical blocks included in one or more of NAND modules 110. To improve reliability in recovering user data, it is desirable that the plurality of physical blocks forming a logical block be selected from different NAND modules 110. In FIG. 6, the plurality of physical blocks PB-1, PB-2, PB-3, PB-4, and PB-5 is arranged in NAND modules 110 that are different from each other.

The correspondence of physical blocks and logical blocks is managed by a block correspondence table (not shown).

The DRAM 140 stores (in a table storage unit) an address conversion table 142 that indicates the relationship of physical addresses of a plurality of storage locations (PB-1 to PB-5) distributed in different NAND modules 110-1, 110-2, . . . , 110-M connected to the plurality of interfaces 110b, with respect to one logical block (LB-1) in the NAND modules 110. The CPU 130, based on the address conversion table 142, reads out data stored in a plurality of storage regions of NAND modules 110-1, 110-2, . . . , 110-M corresponding to the logical block.

Figure 7:
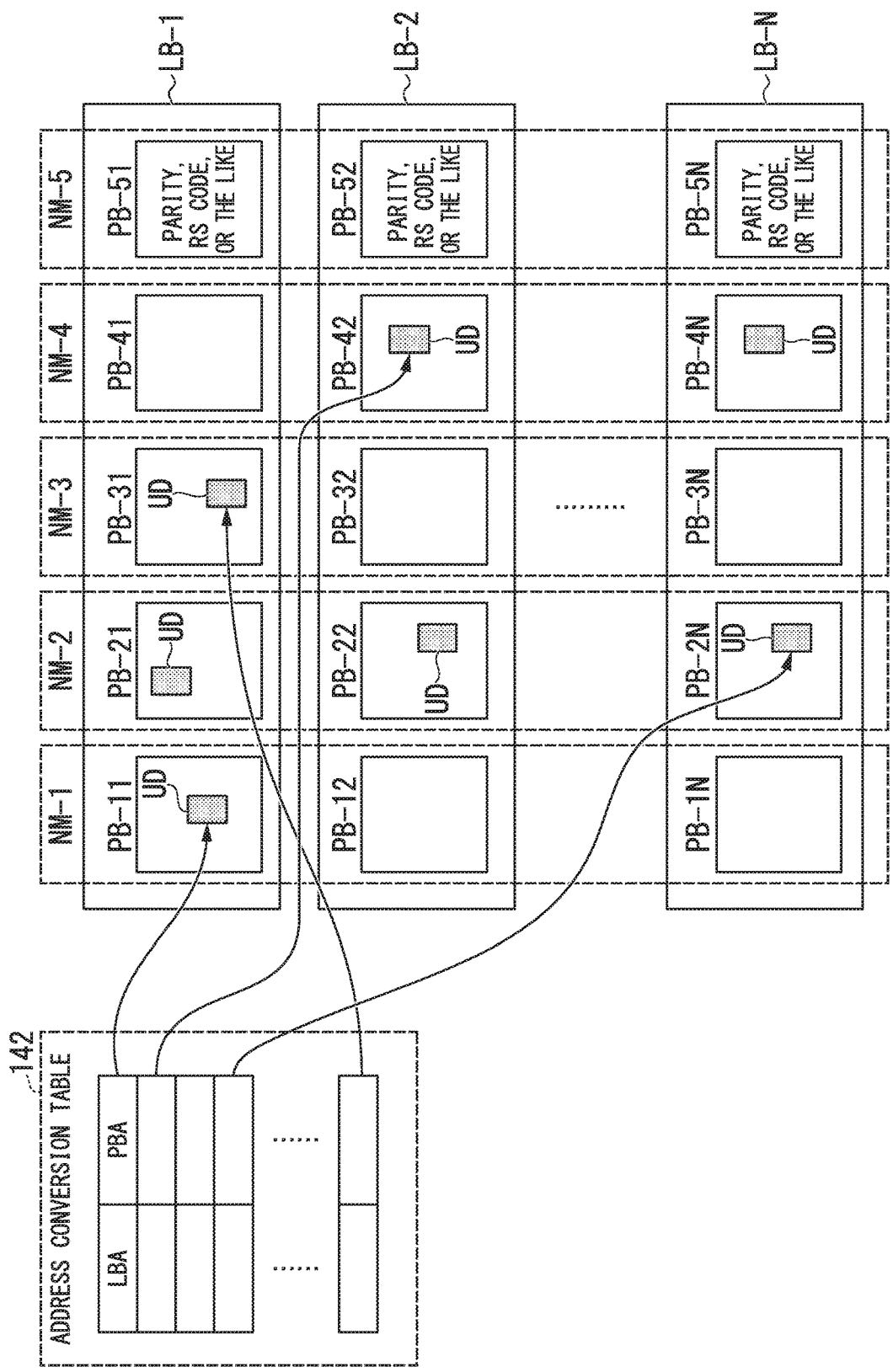
FIG. 7 schematically shows the relationship between an LBA conversion table and physical and logical blocks in the embodiment.

FIG. 7 shows the relationship between the LBA conversion table 142a and the physical and logical blocks in the present embodiment.

In FIG. 7, each of the logical blocks LB-1, LB-2, . . . , LB-N includes the five physical blocks PB-11 to PB-1N, PB-21 to PB-2N, PB-31 to PB-3N, PB-41 to PB-4N, and PB-51 to PB-5N. In the following, if there is no particular need to distinguish physical blocks, PB-1, PB-2, PB-3, PB-4, and PB-5 will be used. It is desirable that the five physical blocks PB-1, PB-2, PB-3, PB-4, and PB-5 are included in different NAND modules 110 (shown as NM-1, NM-2, NM-3, NM-4, and NM-5 in FIG. 7), respectively.

Of the physical blocks PB-1, PB-2, PB-3, PB-4, and PB-5, the physical blocks PB-1, PB-2, PB-3, and PB-4 store user data (UD). Error correction data corresponding to the user data stored in the physical blocks PB-1, PB-2, PB-3, and PB-4 in the same logical block are written as redundant data in the physical block PB-5. Examples of error correction data include an error detection code such as a parity code or an error correcting code (ECC) such as a Reed-Solomon (RS) error correcting code.

The DRAM 140 stores (in a table storage unit) an address conversion table 142 that indicates the relationship of physical addresses of the plurality of storage positions (PB-11 to PB-51) of different NAND modules 110 (NM-1 to NM-5) connected to the plurality of interfaces 100b, with respect to each logical block (LB-1) of the NAND modules 110. The CPU 130, based on the address conversion table 142, reads out data stored in a plurality of storage regions of the plurality of NAND modules corresponding to the logical block.

Figure 8:
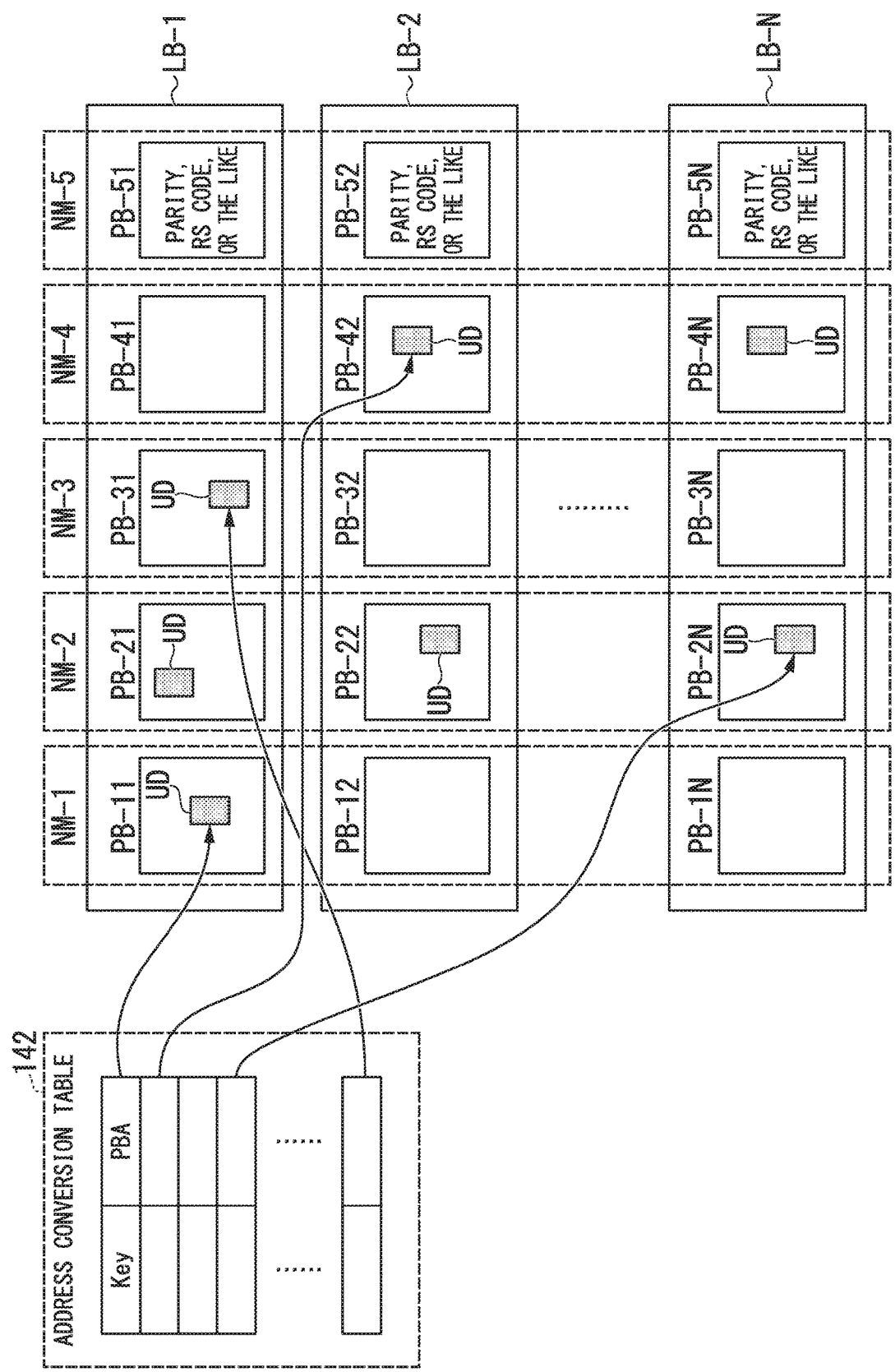
FIG. 8 schematically shows the relationship between a key-value-type address conversion table and physical and logical blocks in the embodiment.

FIG. 8 shows the relationship between a key-value address conversion table 142 and physical and logical blocks in the present embodiment.

In FIG. 8, each of the logical blocks LB-1, LB-2, . . . , LB-N has the five physical blocks PB-11 to PB-1N, PB-21 to PB-2N, PB-31 to PB-3N, PB-41 to PB-4N, and PB-51 to PB-5N. In the following, if there is no particular need to distinguish a physical block, PB-1, PB-2, PB-3, PB-4, and PB-5 will be used. It is desirable that the five physical blocks PB-1, PB-2, PB-3, PB-4, and PB-5 are each included in different NAND modules 110 (shown as NM-1, NM-2, NM-3, NM-4, and NM-5 in FIG. 8).

Of the physical blocks PB-1, PB-2, PB-3, PB-4, and PB-5, the physical blocks PB-1, PB-2, PB-3, and PB-4 store user data (UD). User data are write data associated with a key transmitted from the host 200. An error correction code corresponding to the user data of the physical blocks PB-1, PB-2, PB-3, and PB-4 included in the same logical block is written in the physical block PB-5 of the same logical block as redundant data. Examples of error correction codes include an error detection code such as a parity code or an ECC such as an RS code.

In the present embodiment, redundant data represent the error correction code for recovering user data, which is, for example, an error detection code such as a parity code or an ECC such as an RS code. The error detection code or error correcting code is not limited to the above examples. In the following, a ratio of the lower limit of the amount of data required for storage of user data with respect to the amount of redundant data added to the lower limit of the amount of data will be referred to as the redundancy ratio. The redundant data may be a copy of user data that were stored in a physical block and that are stored into a physical block corresponding to a logical block that is the same as the physical block in which the user data were stored.

(Rules for Configuring a Logical Block)

A logical block is configured by rules that enable recovery of user data even if one NAND module 110 of the plurality of NAND modules 110 attached to the storage system 100 is removed.

The first rule is that, if redundant data, such as a parity data, that enables recovery of data even if one symbol of user data is lost is included in the logical block, as shown in FIG. 7 and FIG. 8, the physical blocks corresponding to the logical block are located in different NAND modules 110, respectively.

The second rule is that, if an RS code that enables recovery of data even if two symbols of user data among the physical blocks included in a logical block are lost is included in the logical block, no more than two physical blocks belong to the same NAND module 110. A symbol is a group of data, which is a continuity of a prescribed bit length.

By including redundant data in a logical block in accordance with the first rule or the second rule, even if an arbitrary NAND module 110 is removed from the interface 100b, the storage system 100 can recover user data that were stored in the removed NAND module 110 from data stored in the other NAND modules 110.

(Garbage Collection)

The storage system 100 configured as described above performs garbage collection with respect to a NAND module 110 installed in the storage system 100. Garbage collection is generally an operation to transfer data other than invalid data from a physical block to other physical blocks, so that the physical block can be erased and storage regions in the physical block can be used for (new) data writing. In the present embodiment, garbage collection is performed to obtain a free logical block from one or more logical blocks included in the storage system 100.

Garbage collection is carried out in accordance with the following procedure.

(1) The CPU 130 refers to the address conversion table 142 and the block correspondence table (not shown), selects an arbitrary logical block as a garbage collection source logical block (target logical block, relocation source logical block), and reads valid data stored in physical blocks included in the garbage collection source logical block.

(2) The CPU 130 selects the garbage collection destination logical block (relocation destination logical block) and copies valid data read out from the garbage collection source logical block into physical blocks corresponding to the garbage collection destination logical block. The garbage collection destination logical block is a logical block that is set as a free logical block before the garbage collection, and is associated with arbitrary physical blocks.

(3) The CPU 130 updates the physical addresses in the address conversion table 142 from the physical addresses corresponding to the garbage collection source logical block to the physical address corresponding to the garbage collection destination logical block.

(4) The CPU 130 sets the garbage collection source logical block as a free logical block. By performing this operation, the CPU 130 collects the garbage collection source logical block as an unused (available) logical block.

(Processing to Remove a NAND Module 110)

The processing for removing a NAND module 110 from the storage system 100 of the present embodiment will be described below.

Figure 9:
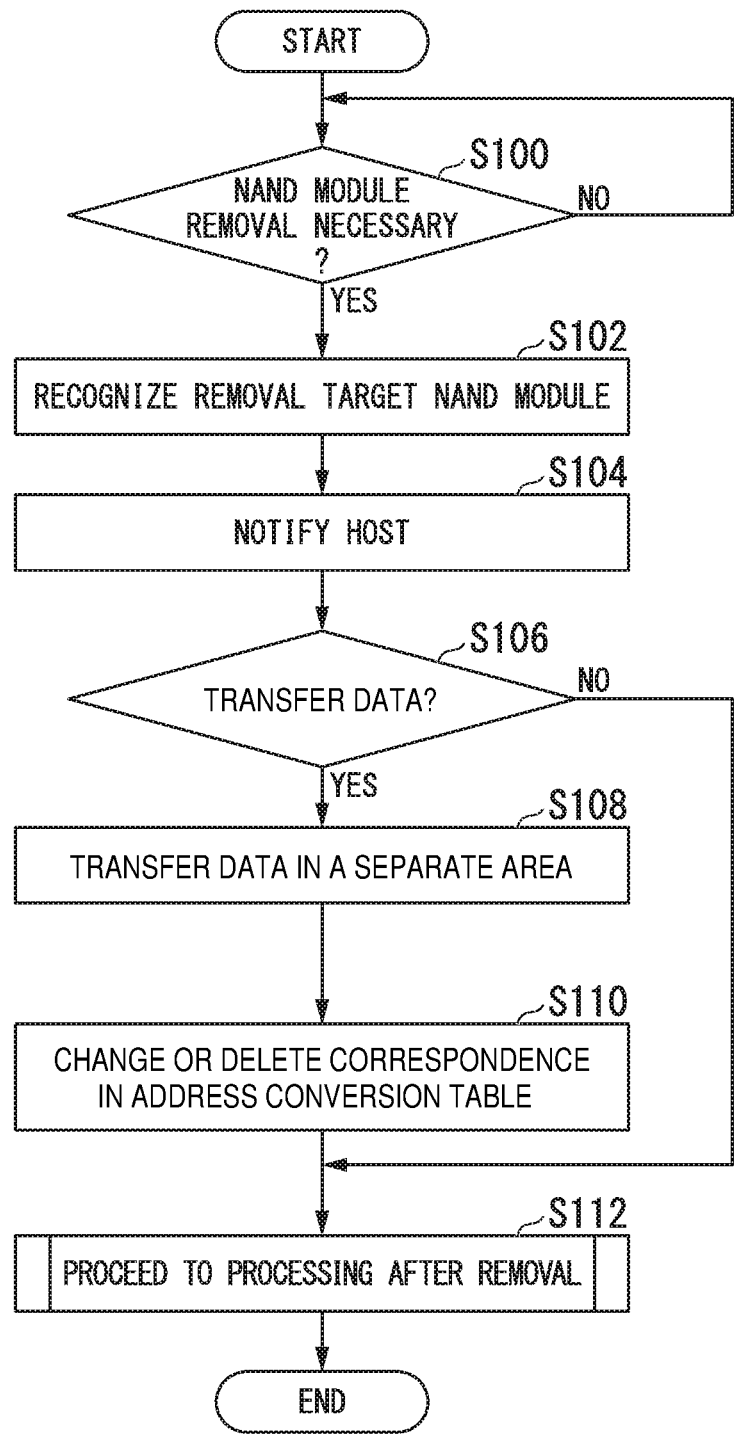
FIG. 9 is a flowchart showing a flow of process carried out for NAND module removal in the memory system according to the embodiment.

FIG. 9 is a flowchart showing a process carried out for NAND module removal in the storage system 100 according to the present embodiment.

First, the CPU 130 determines whether or not a NAND module 110 needs to be removed (step S100). In order to make this determination in step S100, the CPU 130 detects information regarding the reliability of the NAND module 110. For this detection, the CPU 130 obtains information regarding the reliability of the NAND module 110 during the operation of the NAND module 110 or periodically monitors the information regarding the reliability of the NAND module 110.

The information regarding the reliability of the NAND module 110 is, for example, the number of times overwrite operations have been carried out with respect to the NAND module 110 or the error rate with respect to data read requests and data write requests. The CPU 130 monitors the number of overwrites or the number of error detections and determines that the NAND module 110 needs to be removed from the interface 100b, if the number of overwrites, the error rate, or the number of errors exceeds a predetermined threshold. The predetermined threshold may be, for example, an average value of a plurality of pages of the NAND module 110 or a highest value among the plurality of pages. Alternatively, the determination may be made based on a combination of the number of overwrites, the error rate, and the number of errors. The information regarding the reliability of the NAND module 110 is not restricted to the above examples.

The CPU 130 recognizes the NAND module 110 that needs to be removed from the data bus 100a (hereinafter, the removal target NAND module 110) (step S102). Then, the CPU 130 recognizes the logical address corresponding to the physical address included removal target NAND module 110, by referring to the address conversion table 142 and tracks the logical address for future operations. Also, the CPU 130 recognizes data stored in the removal target NAND module 110 corresponding to the recognized physical address and logical address.

The CPU 130 sends a notification about the removal to the host 200 before removal of the NAND module 110 (step S104). The CPU 130, for example, sends a notification that the reliability of the NAND module 110 is low. The CPU

130 may send a notification about the removal by lighting an indicator, such as an LED, if the indicator is provided on the NAND module 110.

It is desirable that the CPU 130 transmit to the host 200 identification information of the logical address recognized in step S102. The identification information is, for example, LBA or key object information. This enables the host 200 to recognize user data that are stored in the removal target NAND module 110.

The host 200 receives the information transmitted by the storage system 100. The host 200, for example, displays the content of the notification about the removal on a display unit. The host 200 causes a display unit to display information notifying the removal of the NAND module 110, information identifying the data stored in the removal target NAND module 110, or information regarding the possibility that readout might become impossible.

The CPU 130 determines whether or not to transfer the data stored in the removal target NAND module 110 (step S106). If a NAND module 110 that does not need to be removed (hereinafter "non-removal target NAND module 110") has sufficient capacity to store the data stored in the removal target NAND module 110, the CPU 130 determines to transfer the data stored in the removal target NAND module 110. For example, the CPU 130 selects a non-removal target NAND module and compares a size of data stored in the removal target NAND module and remaining capacity of the non-removal target NAND module. If the remaining capacity is larger than the size of data in the removal target NAND module, the CPU 130 determines to transfer the data. If the remaining capacity is not larger than the size of data, the CPU 130 selects another non-removal target NAND module and repeats the same process. If the data stored in the removal target NAND module 110 are determined to be transferred (e.g., if there is a non-removal target NAND module that has sufficient remaining capacity) (Yes in step S106), the process proceeds to step S108. If the data stored in the removal target NAND module 110 are determined to be not transferred, the process proceeds to step S112. The CPU 130 may determine to transfer the data stored in the removal target NAND module 110 not only to the free area of a NAND module 110, but also to an external storage device having sufficient free area and capable of storing the data.

The storage controller 136 transfers the data stored in the removal target NAND module 110 to the non-removal target NAND module 110 (different area) (step S108). In other words, the storage controller 136 copies user data stored in a first area of the NAND module 110 to a second area of the NAND module 110.

After the data are transferred to the storage region of the non-removal target NAND module 110, the table manager 134 updates the correspondence between the physical address and the logical address of the write destination in the address conversion table 142 (step S110). If the data are transferred to an area other than a NAND module 110, the table manager 134 deletes the correspondence between the physical address and the logical address of the address conversion table 142 corresponding to the data.

Then, the process proceeds to processing after removal of the NAND module 110 (step S112).

(Processing After NAND Module Removal)

Figure 10:
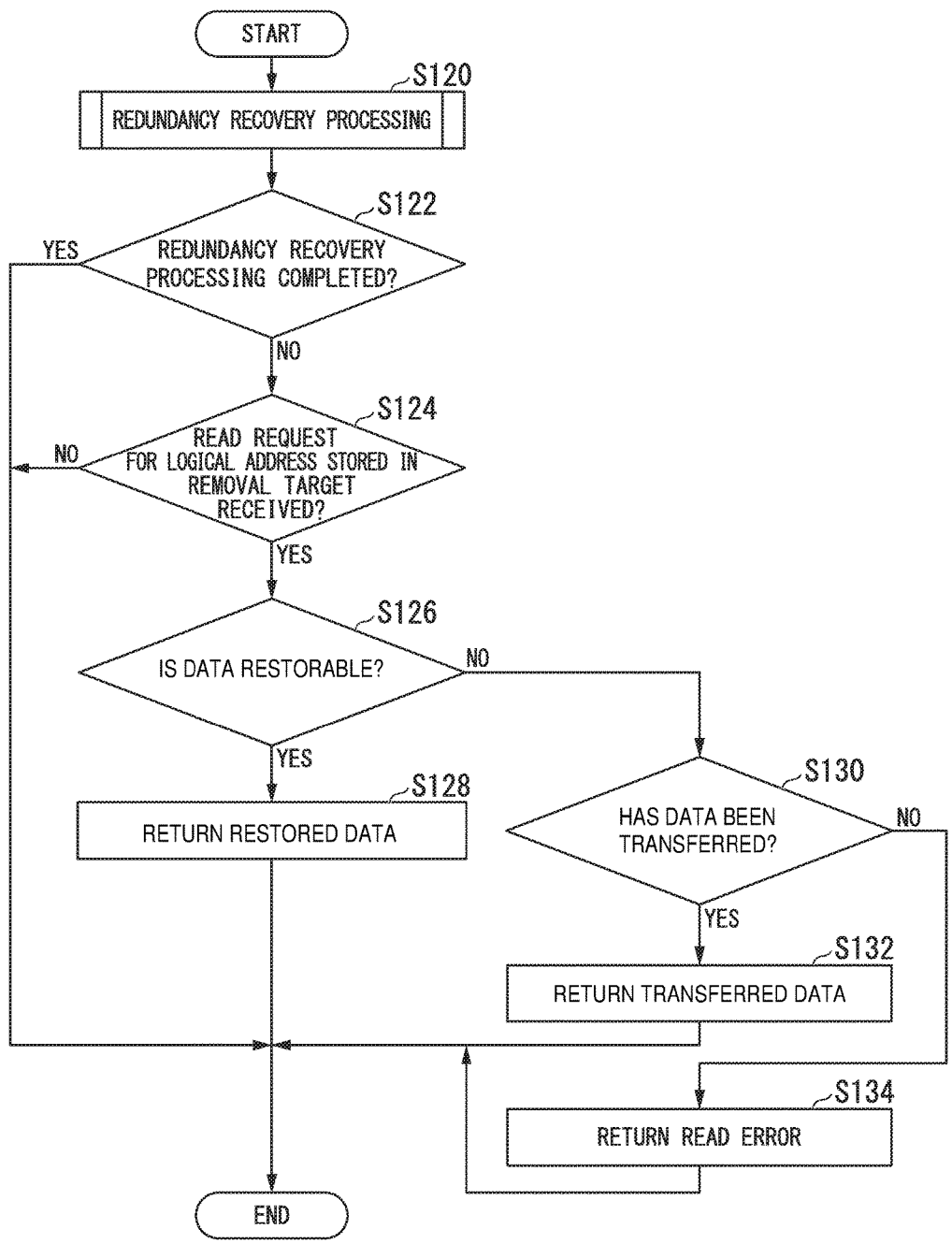
FIG. 10 is a flowchart showing a flow of process carried out after removal of the NAND module according to the embodiment.

FIG. 10 is a flowchart showing the flow of processing after removal of a NAND module in the present embodiment.

After a removal target NAND module 110 has been removed from the interface 100*b*, the CPU 130 performs redundancy recovery processing with respect to the logical block that includes the physical block of the removal target NAND module 110 (step S120). Redundancy recovery processing is processing to recover the redundancy after the NAND module 110 has been removed from the interface 100*b*, to a preset redundancy or a previous redundancy before the NAND module 110 is removed from the interface 100*b*. The CPU 130 executes the redundancy recovery processing in parallel with step S122 and thereafter. Here, redundancy, as described above, is a ratio of the lower limit of the amount of data required for storage of user data with respect to the amount of redundant data added to the lower limit of the amount of data.

The CPU 130 determines whether or not the redundancy recovery processing has been completed (step S122). For example, if the redundancy after the removal target NAND module 110 was removed has reached a preset redundancy, the CPU 130 may determine that the redundancy recovery processing has been completed. If the redundancy after the removal target NAND module 110 was removed has not reached the preset redundancy, the CPU 130 may determine that the redundancy recovery processing has not been completed. The preset redundancy is, for example, a pre-established lower limit of redundancy or the redundancy immediately before the removal target NAND module 110 was removed. The preset redundancy may be a redundancy that is determined based on a condition for copying user data stored in the storage system 100 or a condition for generating the error correction code, or the like. In the present embodiment, the case in which the redundancy has not been recovered to the preset redundancy may be a case in which garbage collection has not been completed yet (NO in step S144).

The process ends if the redundancy recovery processing has been completed (No in step S122), and proceeds to step S124 if the redundancy recovery processing has not been completed (Yes in step S122).

The CPU 130 determines whether or not a read request including a logical address of user data stored in the removal target NAND module 110 has been received from the host 200 (step S124). If the read request including the logical address of user data stored in the removal target NAND module 110 has been received (Yes in step S124), the process proceeds to step S126. If the read request including the logical address of user data stored in the removal target NAND module 110 was not received (No in step S124), the process ends.

If the read request including the logical address of user data stored in the removal target NAND module 110 has been received (Yes in step S124), the CPU 130 determines whether or not the user data corresponding to the logical address included in the received read request can be recovered (restored) (step S126). If the data stored in the removal target NAND module 110 is recoverable (restorable) by a parity code or an RS code or the like in the same logical block as the physical block into which the user data requested by the read request have been stored, the CPU 130 determines that the user data is recoverable. If the user data are determined to be recoverable (Yes in step S126), the CPU 130 includes the data recovered by the parity code, RS code or the like in a read response, and the CPU 130 transmits the user data as recovered in accordance with the read request to the host 200 (step S128).

If it is determined that the data stored in the removal target NAND module 110 is unrecoverable (No in step S126), the CPU 130 determines whether or not the data transferred in the removal target NAND module 110 has been transferred to another storage region (step S130). If it is determined that the data stored in the removal target NAND module 110 had been transferred to another storage region, the CPU 130 reads out the data from the storage region of the second area into which the data had been transferred in step S108, and returns a read response including the, to the host 200 (step S132)

If it is determined that the data stored in the removal target NAND module 110 had not been transferred to another storage region (No in step S130), the CPU 130 returns a read response including a read error to the host 200 (step S134).

(Redundancy Recovery Processing)

Figure 11:
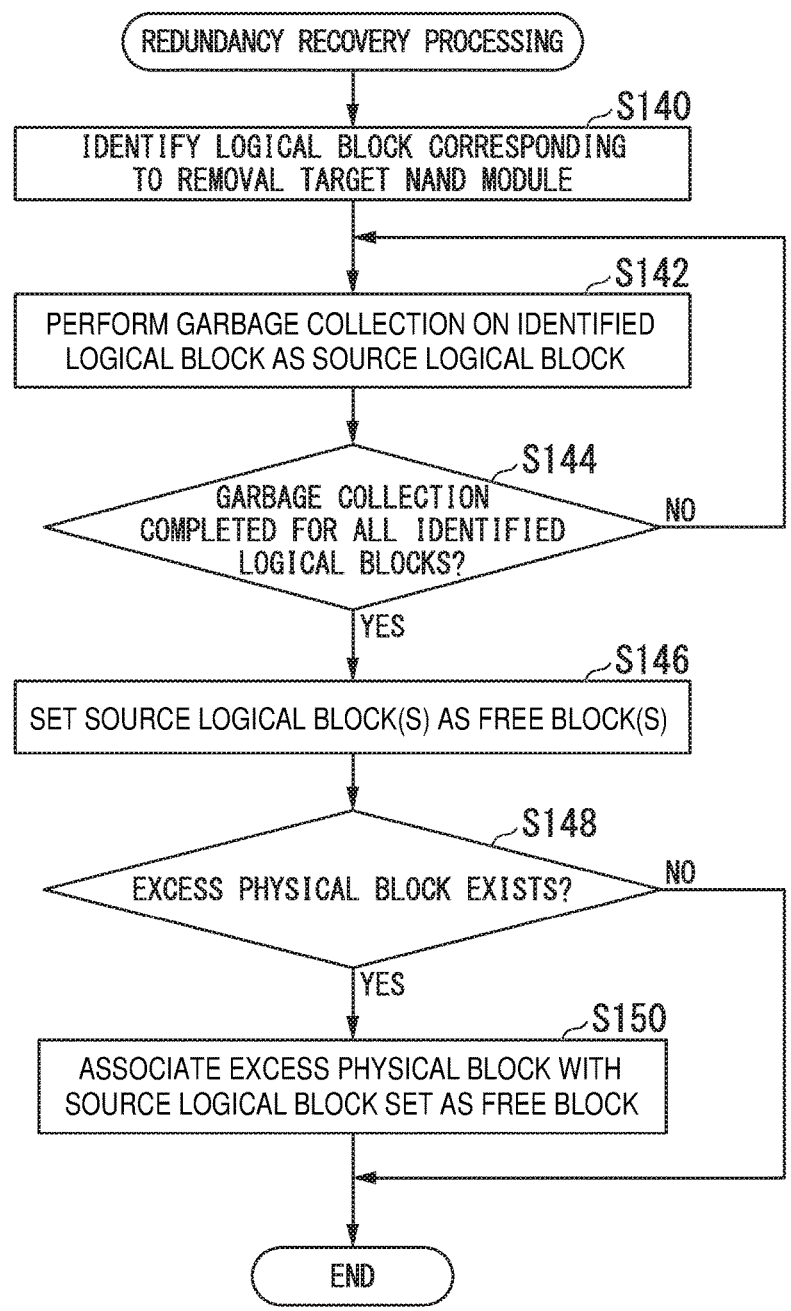
FIG. 11 is a flowchart showing a flow of redundancy recovery processing according to the embodiment.

The redundancy recovery processing according to the present embodiment is described below. FIG. 11 is a flowchart showing the flow of the redundancy recovery processing according to the present embodiment.

First, the CPU 130 specifies the logical block that includes the physical block of the NAND module 100 that was removed from the interface 100b, as a garbage collection source logical block, based on information such as the block correspondence table (not shown) (step S140).

The CPU 130 performs garbage collection as redundancy recovery processing, with respect to the logical block specified at step S140 as the garbage collection source logical block (step S142). The garbage collection module (The CPU 130) for recovery of redundancy specifies, as the garbage collection source logical block, the logical block corresponding to the physical block of the NAND module 110 removed from the interface 100b. Then, the CPU 130 writes the user data corresponding to the garbage collection source logical block to the physical block corresponding to the garbage collection destination logical block. Further, the CPU 130 releases the garbage collection source logical block. In this case, if it is necessary to read user data that were stored in the physical block of the removed NAND module 110, it is possible to recover the desired user data by a parity code, an RS code, or the like of that logical block.

The CPU 130 determines whether or not garbage collection has been completed for all of the logical blocks identified in step S140 (step S144). If garbage collection has not been completed for all of the logical blocks (Ne in step S144), the CPU 130 continues garbage collection. If garbage collection has been completed for all of the logical blocks (Yes in step S144), the CPU 130 sets the garbage collection source logical blocks as free logical blocks (step S146). Specifically, the table manager 134 updates the collected garbage collection source logical blocks as free logical block, in which no valid user data are stored. More specifically, this is implemented by updating information registered in a logical block state management table (not shown) that manages the state of logical blocks.

Figure 12:
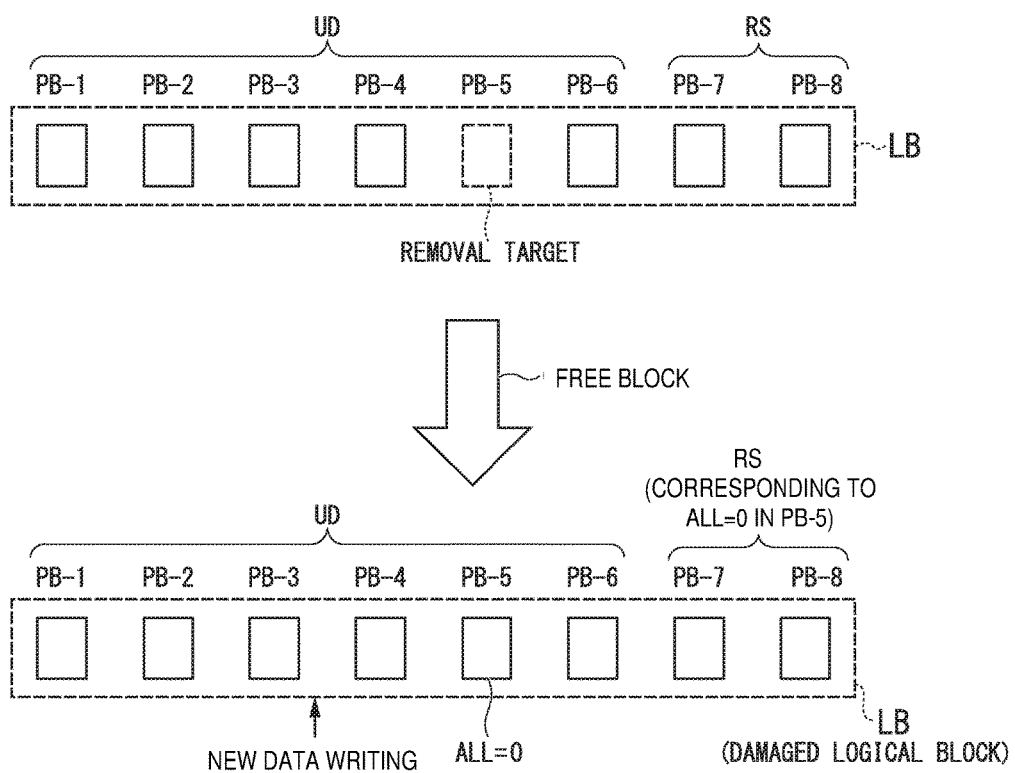
FIG. 12 schematically illustrates garbage collection carried out during the redundancy recovery processing in the embodiment.

FIG. 12 schematically illustrates garbage collection in redundancy recovery processing of the present embodiment. As shown in the top part of FIG. 12, if of the physical block PB-1 to PB-6 included in the logical block (LB) the physical block PB-5 is a removal target NAND module 110, the CPU 130 specifies logical block corresponding to the physical block PB-5 as a garbage collection source logical block. The CPU 130 copies and writes data corresponding to the garbage collection source logical block (including valid data that had been stored into the physical block PB-5) into the garbage collection destination logical block, and collects the garbage collection source logical block as a free logical block.

The CPU 130 writes data into the collected free logical block in response to a write request or the like received subsequently. The CPU 130 writes data into the free logical block as a defective logical block and calculates and writes the RS code based on the written data. A defective logical block is a logical block that includes a physical block from which data cannot be read out normally. The physical block from which data cannot be read out normally may be, not only one in which a logical block no longer exists because of the removal of a NAND module 110, but also a bad physical block with respect to which reading and writing of data cannot be done correctly. A logical block that include no physical block from which data cannot be read out normally, that is, a non-defective logical block, will be referred as a full logical block. As shown in the lower part of FIG. 12, the CPU 130 calculates and writes the RS code as if a prescribed value, for example a data value of 0, is written in the entire storage region of the physical block PB-1. That is, even if the physical block PB-5 corresponding to the removal target NAND module 110 does not actually exist, the CPU 130 allocates a dummy bad physical block (virtual physical block) and stores into the virtual physical block a prescribed value (for example, 0). This enables the CPU 130 to maintain the redundancy with respect to data stored in response to a future write request or the like regarding a collected free logical block.

Next, the CPU 130 determines whether there are excess physical blocks in the overall physical block space of the storage system 100 (step S148). For example, the physical blocks of the NAND modules 110 may include a physical block set as an unused area into which data cannot be stored, because a read error is detected in the physical block at the manufacturing stage. For that reason, there may be an excess physical block that does not configure a logical block. Such a physical block is called as an excess physical block. If there is an excess physical block (Yes in step S148), the CPU 130 can assign the excess physical block to a physical block included in the NAND module 110 removed from the interface 100b set as a collected free logical block through the garbage collection in step S146. If the CPU 130 determines that the excess physical block exists (Yes in step S148), the process proceeds to step S150. If there is no excess physical block (No in step S148), the process ends.

If there is an excess physical block (Yes in step S148), the CPU 130 includes the excess physical block into the logical block collected in step S146 (step S150). If the excess physical block is included into the collected logical block, because a physical block actually exists, there is no need to treat the physical block as the defective logical block when a write request is received subsequently.

(Over-Provisioning Management Processing)

Over-provisioning management processing according to the present embodiment will be described. An over-provisioning ratio is a proportion of available storage capacity, that is, unused (free) areas, of the storage capacity of the NAND modules 110 that is used for data storage. An unused area is a storage region in which no valid data are stored. More specifically, a storage region in which no valid data are stored may be a storage region in which no data have been written after block erasure processing, or a storage region in which valid data became invalid by updating of the address conversion table 142. The storage system 100, for example, periodically calculates the over-provisioning ratio and manages unused areas so that the over-provisioning ratio does not fall below a prescribed threshold. By carrying out the over-provisioning management processing, the storage system 100 can maintain operational continuity of the NAND modules 110 by reducing the period of time during which free physical blocks cannot be detected when the storage controller 136 writes write data.

Figure 13:
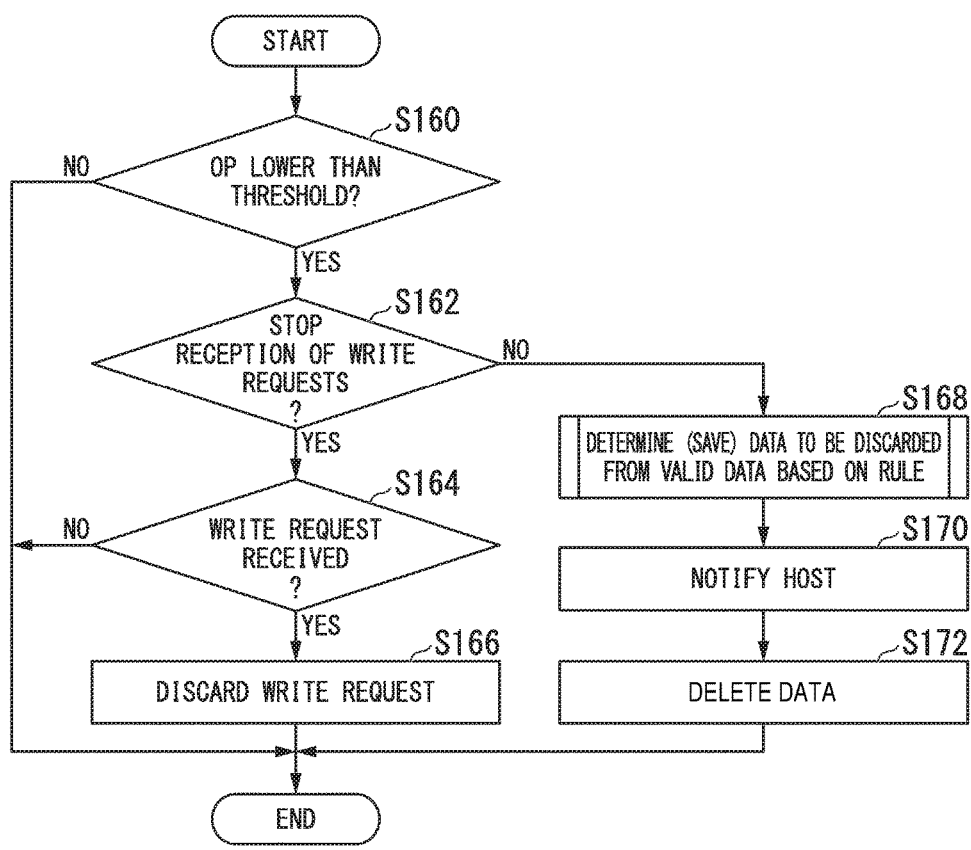
FIG. 13 is a flowchart showing a flow of over-provisioning management processing according to the embodiment.

FIG. 13 is a flowchart showing a process of the over-provisioning management processing according to the present embodiment. The over-provisioning management processing is performed, for example, in parallel with the above-described redundancy recovery processing when a removal target NAND module 110 is removed from the data bus 100a.

First, the CPU 130 determines whether or not the current over-provisioning (OP) ratio is lower than a prescribed threshold (step S160). The prescribed threshold is set beforehand, and is, for example, approximately 5 to 20%. If a NAND module 110 is removed from the data bus 100a, the overall storage region of the storage system 100 is reduced by the amount of physical blocks corresponding to the storage region of the removal target NAND module 110. For this reason, if a removal target NAND module 110 is removed, the over-provisioning ratio may be reduced. If the CPU 130 determines that the current over-provisioning ratio is not below a prescribed threshold (No in step S160), the process ends.

If the CPU 130 determines that the current over-provisioning ratio is below the prescribed threshold (Yes in step S160), the CPU 130 determines whether or not to stop reception of write requests (step S162). If, for example, the CPU 130 sets to stop reception of write requests (Yes in step S162), write requests are stopped. If the CPU 130 stops the reception of write requests, and if the above-described redundancy recovery processing is still being carried out, subsequent garbage collection regarding logical blocks that include physical blocks of removal target NAND module 110 may be stopped.

If the CPU 130 stops the reception of write requests (Yes in step S162), the CPU 130 determines whether or not a write request has be received (step S164). If a write request has been received (Yes in step S164), the CPU 130 discards the write request (step S166). If a write request has not been received (No in step S164), the process ends.

If the CPU 130 does not stop the reception of write requests (No in step S162), the CPU 130 determines data to be deleted from valid data, based on a prescribed rule (step S168). By deleting valid data of the overall storage region of the storage system 100, the CPU 130 can increase the over-provisioning ratio by the amount of the data to be deleted. The "deleting" of data includes, for example, the deletion of the logical address associated with that data from the address conversion table 142. Also, "deleting" of data may include the erasure of a flag that is applied to indicate valid data, or the application of a flag that indicates invalid data.

Then, the CPU 130 notifies the host 200 that data stored in a NAND module 110 has been deleted (step S170). It is desirable that the CPU 130 transmit to the host 200 information that identifies the data to be deleted as LBA, key-value, or the like.

The CPU 130 deletes the data determined to be deleted in step S168 (step S172). Before deleting the data that is determined to be deleted in step S168, the CPU 130 may copy the data and store the data into a storage region of an external device separate from the storage system 100. If the CPU 130 knows communication information such as the IP address of the external device into which the data to be deleted can be stored, and the data to be deleted are determined in step S168, the CPU 130 may transmit the data to be deleted to the external device. This enables the CPU 130 to store data to be deleted to an external device. In other words, the CPU 130 reads at least part of the data to be deleted from the NAND module 110 and transmits the part of the data to a storage region of an external device different from the NAND module 110, before the CPU 130 deletes the data stored in the NAND module 110.

If a read request to read the deleted data that has been stored in the external device is received, the CPU 130 can obtain the read request data as data stored in step S132 in FIG. 10. If, the CPU 130 receives a read request for the deleted data that are not stored anywhere, the CPU 130 returns either a read error or a prescribed value in step S134 in FIG. 10.

(Processing to Determine Data to be Deleted)

Processing to determine data to be deleted according to the present embodiment will be described.

If data stored in the NAND module 110 are managed in the LBA conversion table 142, the CPU 130, in addition to deleting the data to be deleted, performs processing so that a write request that designates the LBA corresponding to the physical block in which the deleted data have been written is not accepted. The processing so that a write request that designates the LBA corresponding to the deleted data is not accepted is, for example, the first through third processing described below.

The first processing is processing of determining data stored in a physical block corresponding to LBA deleted from an LBA conversion table 142a shown in FIG. 4, as data to be deleted.

Figure 14:
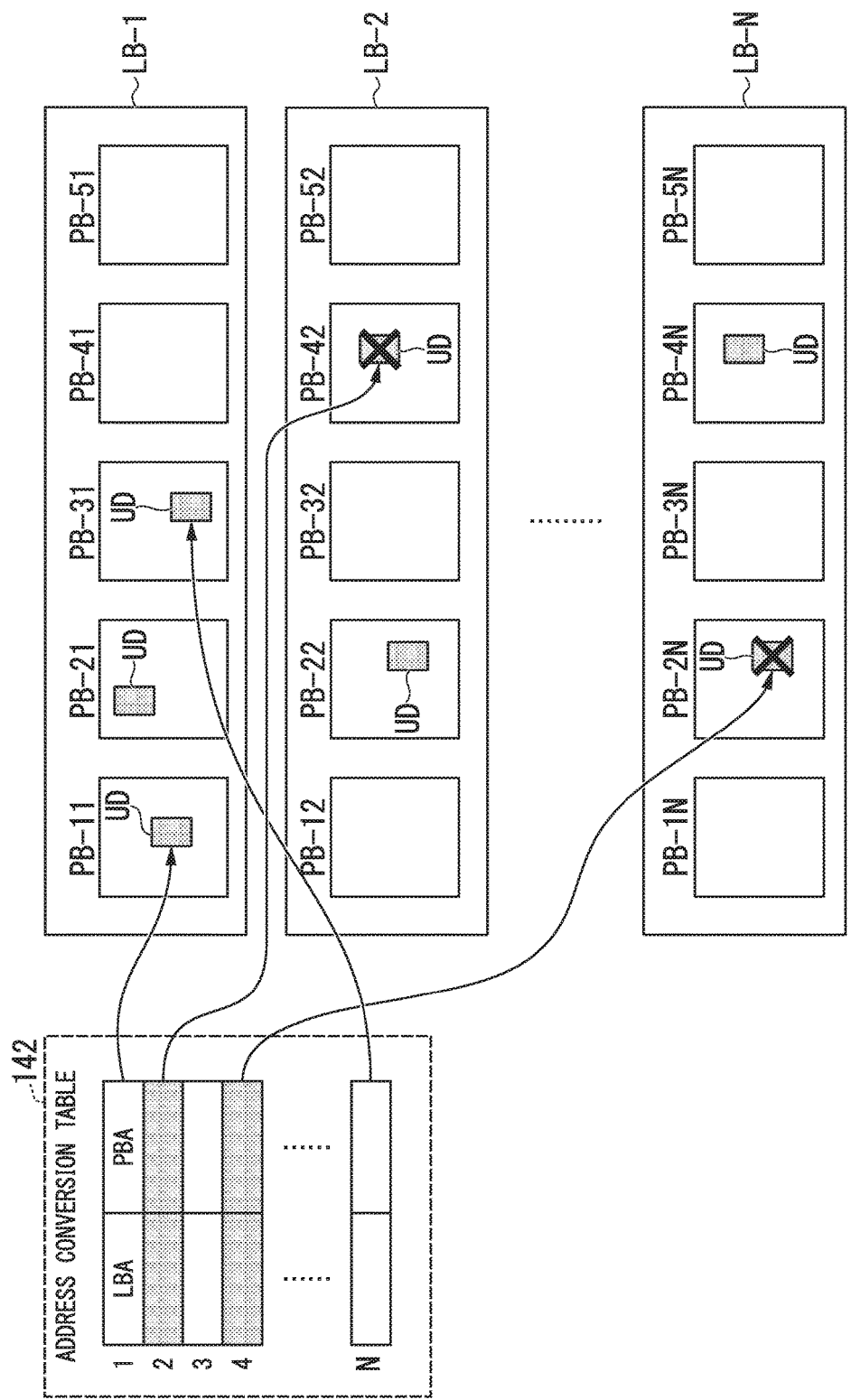
FIG. 14 schematically illustrates management of an LBA space according to the embodiment.

FIG. 14 illustrates the LBA space in the present embodiment. The CPU 130 determines the LBAs identified as numbers 2 and 4 as the LBA to be deleted, and outputs these LBAs to the table manager 134. As shown in FIG. 14, the CPU 130 determines the user data stored in the physical block PB-42 of the logical block LB-2 and the physical block PB-2N of the logical block LB-N as data to be deleted. In this case, the table manager 134 treats the LBAs of the numbers 2 and 4 as not existing among the LBAs of the numbers 1 to N. As a result, if the CPU 130 accepts a write request designating LBAs of the numbers 2 and 4, the table manager 134 can notify the host 200 of a write error that the LBAs corresponding to the write request do not exist. As a result, user data corresponding to the LBAs stored in the physical block PB-42 of the logical block LB-2 and the physical block PB-2N of the logical block LB-N become invalid data, and it is possible to increase the over-provisioning ratio.

When the CPU 130 determines the data to be deleted, it is desirable that a distributed plurality of LBAs (part of the LBAs) be specified, based on the importance level of the user data stored in the physical block corresponding to the LBAs. The CPU 130 may set such that the importance level of user data becomes higher, as the frequency of readout or the frequency of updating becomes higher. The CPU 130 may receive information in which the LBA of user data and the importance level are associated by the host 200 or the storage controller 136. In this case, the CPU 130 can determine the data to be deleted, based on the received importance level.

Figure 15:
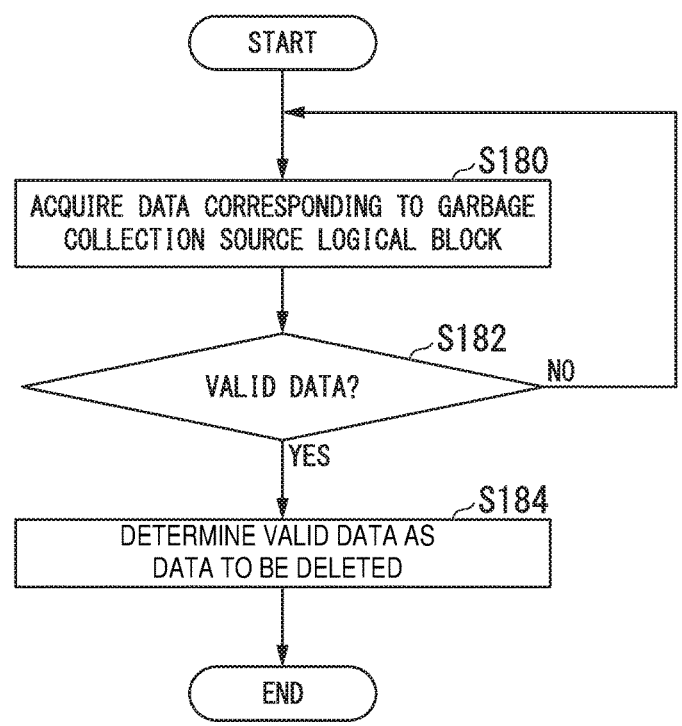
FIG. 15 is a flowchart showing a flow of processing to determine data to be deleted according to the embodiment.

Alternatively, in order to simplify the processing to determine the data to be deleted, the CPU 130 may set valid data included in the garbage collection source logical block as the data to be deleted. The specific processing is shown in FIG. 15, which is a flowchart illustrating a process of processing to determine data to be deleted according to the present embodiment.

During garbage collection, the CPU 130 acquires data from a physical block corresponding to a garbage collection source logical block (step S180). The CPU 130 determines whether or not the data stored in the physical block corresponding to the garbage collection source logical block is valid data (step S182). Then, the CPU 130, for example, reads out from the address conversion table 142a a value indicating whether the data corresponding to the garbage collection source logical block are valid or invalid and determines whether or not the data are valid. If the data stored in the physical block corresponding to the garbage collection source logical block are valid data (Yes in step S182), the CPU 130 determines that the valid data are the data to be deleted (step S184). If the data stored in the physical block corresponding to the garbage collection source logical block is invalid data (No in step S182), the process returns to step S180 and the CPU 130 acquires the data corresponding to the next garbage collection source logical block.

The second processing reduces the maximum value of the logical address in the logical address (LBA) space of the storage system 100 when the storage system 100 includes an LBA conversion table 142a as shown in FIG. 4. That is, the second processing reduces the range of values in which the logical addresses can take.

Figure 16:
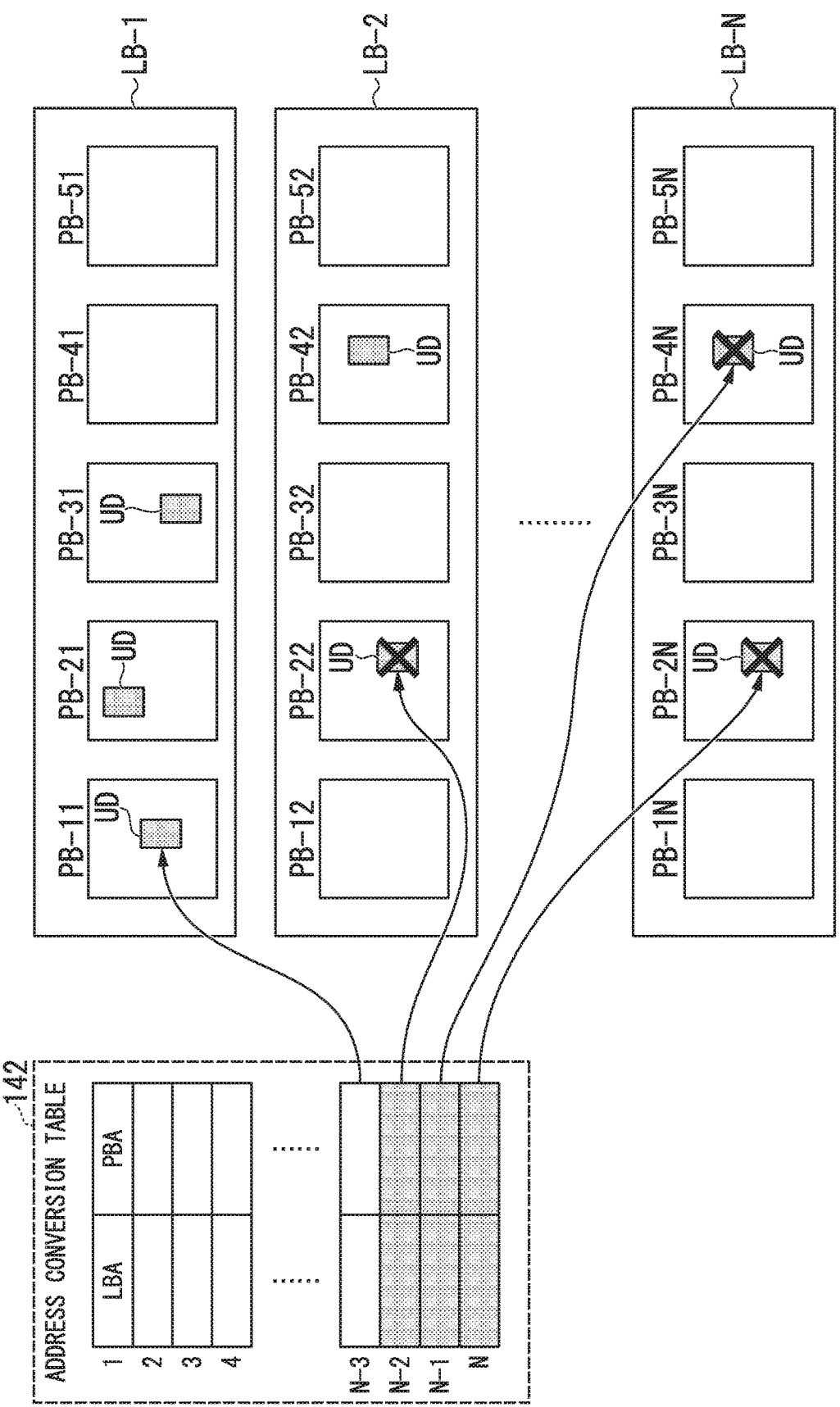
FIG. 16 schematically illustrates another management of an LBA space according to the embodiment.

FIG. 16 describes another control of the LBA space according to the present embodiment. When 1 to N are assigned to the LBA, the CPU 130 reduces the maximum LBA in the LBA space to N-3. By doing this process, the CPU 130 deletes the LBAs of the numbers N-2, N-1, and N from the LBA space and determines that the data stored in the physical blocks corresponding to LBAs with the numbers N-2, N-1, and N are data to be deleted. If the CPU 130 receives a read request or a write request that designates the LBAs of the numbers N-2, N-1, and N, the CPU 130 notifies the host 200 of an error because these LBAs are not in the address conversion table 142a. As a result, the user data corresponding to the LBAs stored in the physical block PB-22 of the logical block LB-2 and the physical blocks PB-2N and PB-4N of the logical block LB-N, which correspond to the LBAs of the numbers N-2, N-1, and N become invalid data, and the over-provisioning ratio can be increased as a result.

The user data managed by the LBA space might have a higher importance level, as the number specifying the LBA in the LBA space decreases. For that reason, by reducing the maximum LBA space value, the CPU 130 can avoid determining that user data of a high importance level among the user data managed by the LBA space are data to be deleted.

The third processing is processing of deleting data corresponding to an arbitrary key in a key-value address conversion table 142b shown in FIG. 5.

Figure 17:
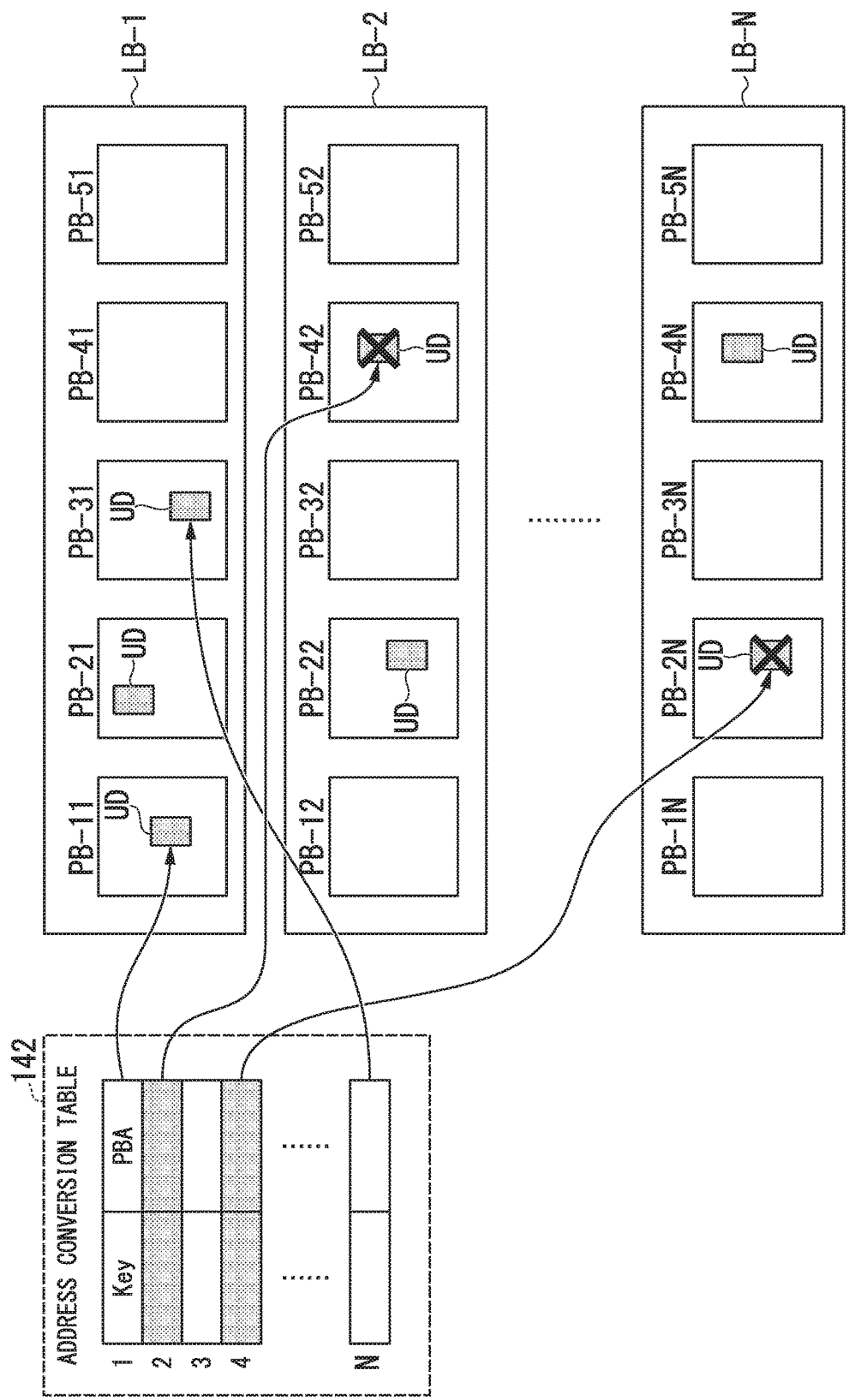
FIG. 17 schematically illustrates management of a key-value logical address space according to the embodiment.

FIG. 17 illustrates the control of a key-value logical address space according to the present embodiment. The CPU 130 determines the second and the fourth keys of the address conversion table as the part of the keys to be deleted and outputs the determined keys to the table manager 134. As shown in FIG. 17, the CPU 130 determines that the user data stored in the physical block PB-42 of the logical block LB-2 and the physical block PB-2N of the logical block LB-N are to be deleted. In this case, the table manager 134 can treat data corresponding to the second and the fourth keys in the address conversion table as having been deleted. As a result, the user data corresponding to these keys that were stored in the physical block PB-42 of the logical block LB-2 and the physical block PB-2N of the logical block LB-N become invalid data, and the over-provisioning ratio can be increased as a result.

When the CPU 130 has received a request to write additional data from the host 200, the CPU 130 can notify the host 200 of an error that there is insufficient writable capacity, and the over-provisioning ratio can be maintained as a result.

When the CPU 130 determines data to be deleted, it is desirable that the key be specified based on the importance level of the user data stored in physical block corresponding to the key. The CPU 130, for example, sets the importance level higher, as the frequency of readouts or the frequency of updating of the user data increases.

The CPU 130 may receive information in which the user data keys and the importance levels are associated with each other by the host 200 or the storage controller 136. In that case, the CPU 130 can determine the data to be deleted, based on the received importance level. Alternatively, in order to simplify the processing to determine the data to be deleted, the CPU 130 may determine that valid data included in the garbage collection source logical block are the data to be deleted. Because it is possible to perform the same type of processing as shown in FIG. 15, the details of the processing will not be described.

Also, similar to the processing of FIG. 16, the CPU 130 may select keys stored at the end of the address conversion table as part of the keys for deletion. Because the processing is the same as the above-described processing, except for the locations in which the keys are stored in the address conversion table, the details of the processing will not be described.

(Processing to Mount a NAND Module)

Processing for mounting a NAND module 110 in the storage system 100 according to the present embodiment will be described. In the storage system 100 according to the present embodiment, when a NAND module 110 is attached to an interface 100b, the CPU 130 changes the relationships between the physical addresses formed by the plurality of NAND modules 110 attached to the plurality of interfaces 100b and the logical addresses in the address conversion table 142.

Figure 18:
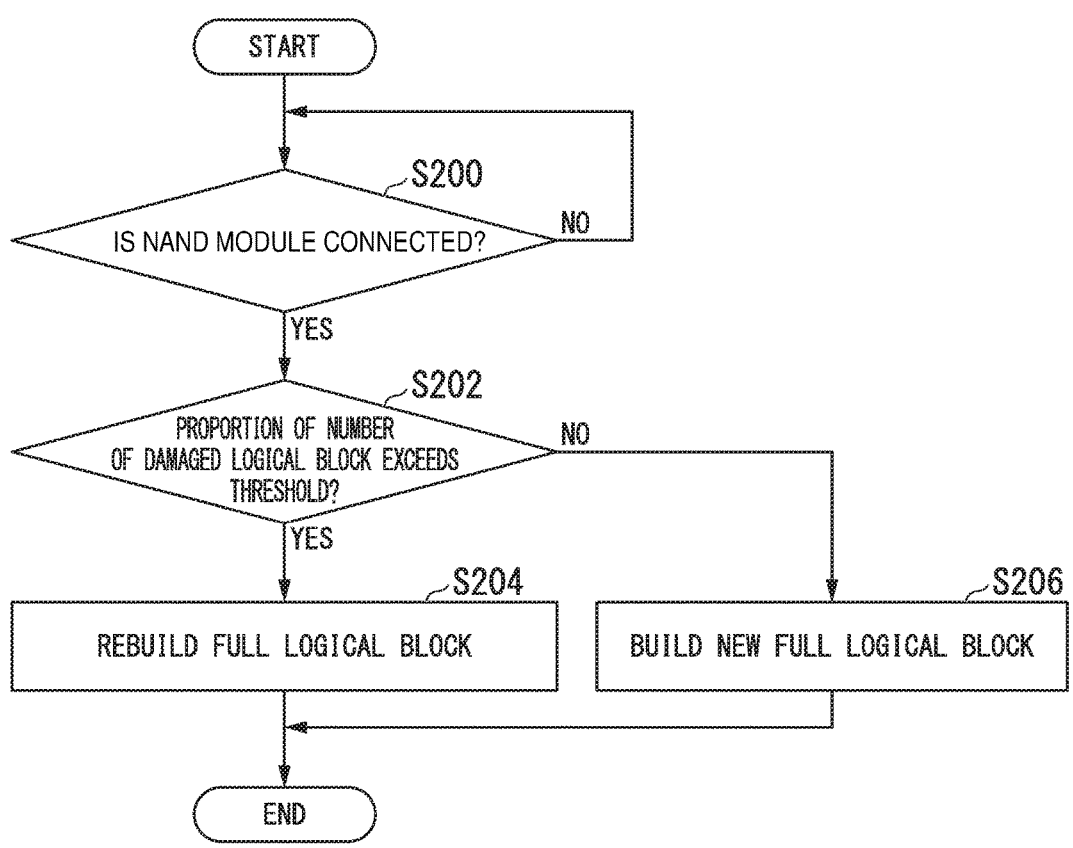
FIG. 18 is a flowchart showing a flow of processing to mount a NAND module according to the embodiment.

FIG. 18 is a flowchart showing the flow of process to mount a NAND module 110 according to the present embodiment. The CPU 130 determines whether or not a NAND module 110 has been connected (attached) to the storage system 100 (step S200). When the module interface 100a of the NAND module 110 is attached to the interface 100b of the storage system 100, and the NAND module 110 is electrically connected to the CPU 130, the CPU 130 determines that the NAND module 110 has been mounted to the storage system 100. If the NAND module 110 is not electrically connected to the CPU 130 (No in step S200), the CPU 130 waits.

Then, the CPU 130 determines whether or not the proportion of the number of defective logical blocks with respect to the number of the overall logical blocks of the storage system 100 exceeds a prescribed threshold (step S202). The prescribed threshold is a value set beforehand, and can be changed by the administrator of the storage system 100.

If it is determined that the proportion exceeds the prescribed threshold (Yes in step S202), the CPU 130 allocates a physical block of a NAND module 110 newly attached to the storage system 100 in place of the physical block incapable of performing normal data reading that is included in the defective logical blocks. By carrying out this process, the CPU 130 allocates physical blocks of a newly attached NAND module 110 to a physical block incapable of performing normal data reading and rebuilds a full logical block that does not include a physical block incapable of performing normal data reading. (step S204). When a full logical block has been rebuilt, the CPU 130 changes the address conversion table 142 and the block correspondence table (not shown) regarding the rebuilt full logical block.

If, as shown in FIG. 12, the a prescribed value is, for example, written into a virtual physical block (PB-5) including in a removal target NAND module 110, the RS code or the like is already calculated. Thus, the CPU 130 need not recalculate the RS code or the like. If a write request is received following the collection of a logical block as a free logical block through garbage collection, the CPU 130 can designate the physical block allocated in place of a physical block incapable of performing normal data reading as a physical block for data writing. In this manner, if a physical block of a NAND module 110 newly attached to the storage system 100 is allocated, an actual physical block for data writing exists. Thus, it is not necessary to treat the corresponding logical block as a defective logical block as described above when a write request or the like is received subsequently.

The CPU 130 may allocate a physical block of a NAND module 110 that is newly attached, in place of a virtual physical block corresponding to a physical block for which garbage collection has not yet been completed during the redundancy recovery processing, which is described with reference to FIG. 11. In this case, the CPU 130 may implement the redundancy recovery processing by restoring and writing the data that had been stored in a removed physical block into the physical block of a newly attached NAND module 110.

If the CPU 130 determines that the proportion of the number of defective logical blocks with respect to the number of overall logical blocks does not exceed a prescribed threshold (No in step S202), the CPU 130 builds a new full logical block (step S206). When the CPU 130 builds a new full logical block, the CPU 130 updates the address conversion table 142 and the block correspondence table (not shown) regarding the newly built full logical block.

The storage system 100 can increase the over-provisioning ratio, by replacing a virtual logical block of a defective logical block with a physical block of a newly attached NAND module 110, or by establishing a new full logical block. For that reason, the determination of whether or not the over-provisioning ratio exceeds the threshold in step S160 switches to negative, i.e., No. As a result, according to the storage system 100, the setting to stop reception of write requests can be released, enabling the writing of write data into a NAND module 110 based on a new write request.

Specifically, as shown in FIG. 14 and FIG. 16, the writing of write data with respect to the deleted LBA restarts. If, as shown in FIG. 14, a distributed plurality of LBAs is deleted, and a new write request with respect to a deleted LBA is received, the CPU 130 can write the write-requested data into the physical block that is the writing destination. If, as shown in FIG. 16, the maximum value of the LBA space is reduced and then the maximum value of the LBA space is returned to the value before reduction, and a new write request with respect to the increased LBA is received, the CPU 130 can write the write-requested data into the physical block that is the write destination. In the third processing, in which the storage system 100 includes a key-value address conversion table 142*b* as shown in FIG. 5, if a request to write additional data is received from the host 200, instead of sending a notice that there is insufficient writable capacity to the host 200, it is possible to write the data requested to be written in the corresponding physical block.

According to one or more of the above-described embodiments, a storage system 100 includes a plurality of interfaces 100*b* to or from which NAND modules 110 that store data can be attached or removed, and a CPU 130 that changes the correspondence relationship between physical addresses and logical addresses in an address conversion table 142. Even if a NAND module 110 is removed from an interface 100*b*, it is possible to avoid a situation in which writing and reading of data becomes impossible.

While certain embodiments have been described, these embodiments have been presented by way of example only, and are not intended to limit the scope of the inventions. Indeed, the novel embodiments described herein may be embodied in a variety of other forms, and various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A storage system connectable to a host, comprising:
a plurality of interface units;
a plurality of semiconductor memory modules, each being detachably coupled with one of the interface units; and
a controller configured to maintain an address conversion table indicating mapping between a logical address and a physical address of a memory region of the semiconductor memory modules, wherein
when the controller determines that a first semiconductor memory module is to be detached, the controller converts physical addresses of the first semiconductor memory module into corresponding logical addresses using the address conversion table, copies valid data stored in the physical addresses to another semiconductor memory module, and updates the address conversion table to indicate new mappings for the corresponding logical addresses of the valid data,
each of the plurality of the semiconductor memory modules includes a plurality of physical blocks, each having a plurality of physical addresses,
the plurality of the semiconductor memory modules are divided logically into a plurality of logical blocks, a first logical block of the plurality of logical blocks corresponding to a plurality of first physical blocks, each of the plurality of first physical blocks being included in the plurality of physical blocks of each of the plurality of the semiconductor memory modules,
each of the logical blocks includes user data and redundancy data, the redundancy data corresponding to the user data, the redundancy data being data for recovering the user data,
after the first semiconductor memory module has been detached from the corresponding interface unit, the controller specifies a logical block corresponding to a physical block of the detached first semiconductor memory module as a garbage collection source logical block and carries out garbage collection,
when the garbage collection has been completed for the logical block corresponding to the physical block of the detached first semiconductor memory module, the controller sets the garbage collection source logical block as a free logical block and associates an excess physical block in an overall physical block space of the storage system, which is not associated with any logical block, with the free logical block, after the garbage collection, when a read request including the logical address of a first user data stored in the detached first semiconductor memory module has been received from the host, the controller determines whether or not the first user data corresponding to the logical address included in the received read request can be recovered, and when the first user data is recoverable, the controller recovers the first user data and transmits the recovered first user data to the host.

2. The storage system according to claim 1, wherein when the first user data is not recoverable, the controller determines whether or not the first user data has been transferred to the another semiconductor memory module, when the first user data has been transferred to the another semiconductor memory module, the controller transmits the transferred first user data to the host, and when the first user data has not been transferred to the another semiconductor memory module, the controller returns a read response including a read error to the host.

3. The storage system according to claim 1, wherein when the controller determines that data stored in the plurality of first physical blocks of the first semiconductor memory module is to be read, the controller recovers the first user data using redundancy data of the first logical block.

4. The storage system according to claim 1, wherein the redundancy data includes a parity code or an RS code.

5. The storage system according to claim 1, wherein the controller is further configured to send the corresponding logical addresses to the host.

6. The storage system according to claim 1, wherein the controller determines that the first semiconductor memory module is to be detached, when the first semiconductor memory module includes a memory region that has been subjected to accesses more than a predetermined number of times.

7. The storage system according to claim 1, wherein the controller determines that the first semiconductor memory module is to be detached, when the first semiconductor memory module has a memory region to which access has failed more than a predetermined number of times.

8. The storage system according to claim 1, wherein a physical block that has not been mapped in the address conversion table is newly associated with and logically contained in the logical block that has been subjected to the garbage collection.

9. The storage system according to claim 1, wherein when the first semiconductor memory module is detached from the corresponding interface unit and a second semiconductor memory module is attached to an interface unit corresponding thereto, a physical block of the second semiconductor memory module is newly associated with and logically contained in a logical block that logically contains a physical block of the first semiconductor memory module.

10. A method for tracking mappings between logical addresses and physical addresses of memory regions of a plurality of semiconductor memory modules, comprising:

determining that a first semiconductor memory module is to be detached from a first interface unit of a storage system, the first semiconductor memory module including a plurality of physical blocks, each having a plurality of physical addresses;

converting the plurality of physical addresses of the first semiconductor memory module into corresponding logical addresses using the mappings;

copying valid data stored in the corresponding logical addresses of the first semiconductor memory module to another semiconductor memory module and updating the mappings to indicate new mappings for the corresponding logical addresses of the valid data;

after the first semiconductor memory module has been detached from the first interface unit, specifying a first logical block corresponding to a plurality of first physical blocks of the detached first semiconductor memory module as a garbage collection source logical block and carrying out garbage collection, the first logical block including first user data and redundancy data for recovering the first user data;

when the garbage collection has been completed for the logical block corresponding to the physical blocks of the detached first semiconductor memory module, setting the garbage collection source logical block as a free logical block and associating an excess physical block in an overall physical block space of the storage system, which is not associated with any logical block, with the free logical block, after the garbage collection, when a read request including the logical address of a first user data stored in the detached first semiconductor memory module has been received from a host, determining whether or not the first user data corresponding to the logical address included in the received read request can be recovered; and when the first user data is recoverable, recovering the first user data and transmitting the recovered first user data to the host.

11. The method according to claim 10, wherein the plurality of semiconductor memory modules are each detachably coupled with one of interface units of the storage system, each of the plurality of the semiconductor memory modules includes a plurality of physical blocks, each having a plurality of physical addresses, the plurality of the semiconductor memory modules are divided logically into a plurality of logical blocks, and each of the plurality of first physical blocks is included in the plurality of physical blocks of each of the plurality of the semiconductor memory modules.

12. The method according to claim 10, further comprising:

when the first user data is not recoverable, determining whether or not the first user data has been transferred to the another semiconductor memory module;

when the first user data has been transferred to the another semiconductor memory module, transmitting the transferred first user data to the host; and when the first user data has not been transferred to the another semiconductor memory module, returning a read response including a read error to the host.

13. The method according to claim 10, further comprising:

when determining that data stored in the plurality of first physical blocks of the first semiconductor memory module is to be read, recovering the first user data using the redundancy data of the first logical block.

14. The method according to claim 10, wherein the redundancy data includes a parity code or an RS code.

15. The method according to claim 10, further comprising:
- sending the corresponding logical addresses to the host connected to the storage system.

16. The method according to claim 10, wherein
- a physical block that has not been mapped in an address conversion table is newly associated with and logically contained in the first logical block that has been subjected to the garbage collection.

17. The method according to claim 10, wherein
- when the first semiconductor memory module is detached from the first interface unit and a second semiconductor memory module is attached to the first interface unit, a physical block of the second semiconductor memory module is newly associated with and logically contained in a second logical block that logically contains a physical block of the first semiconductor memory module.

* * * * *